METHOD OF CLEANING

Original Filed June 10, 1954

8 Sheets-Sheet 1

INVENTOR.
Thomas J. Kearney,
BY Paul & Paul
ATTORNEYS.

INVENTOR.
Thomas J. Kearney,
BY Paul & Paul
ATTORNEYS.

Aug. 13, 1957 T. J. KEARNEY 2,802,758

METHOD OF CLEANING

Original Filed June 10, 1954 8 Sheets-Sheet 3

INVENTOR.
Thomas J. Kearney,
BY Paul & Paul
ATTORNEYS.

INVENTOR.
Thomas J. Kearney,
BY Paul & Paul
ATTORNEYS.

METHOD OF CLEANING

Original Filed June 10, 1954

INVENTOR.

Thomas J. Kearney,

BY Paul & Paul

ATTORNEYS.

Aug. 13, 1957 T. J. KEARNEY 2,802,758

METHOD OF CLEANING

Original Filed June 10, 1954 8 Sheets-Sheet 6

INVENTOR.
Thomas J. Kearney,
BY Paul & Paul
ATTORNEYS.

INVENTOR.
Thomas J. Kearney,
BY Paul & Paul
ATTORNEYS.

Aug. 13, 1957 T. J. KEARNEY 2,802,758

METHOD OF CLEANING

Original Filed June 10, 1954 8 Sheets-Sheet 8

INVENTOR.
Thomas J. Kearney,
BY Paul & Paul
ATTORNEYS.

United States Patent Office 2,802,758

Patented Aug. 13, 1957

2,802,758

METHOD OF CLEANING

Thomas J. Kearney, Detroit, Mich., assignor to Detrex Corporation, Detroit, Mich., a corporation of Michigan Original application June 10, 1954, Serial No. 435,888. Divided and this application March 15, 1955, Serial No. 494,397

19 Claims. (Cl. 134—1)

This invention relates to a method of cleaning. More specifically it is concerned with a method for dissolving grease and at the same time removing clinging dirt or "soil" from machine parts by treatment with solvents such as trichloroethylene or the like. Reference is hereby made to my co-pending application Serial No. 435,888, filed June 10, 1954, of which this application is a division, which discloses apparatus suitable for practicing the method of this invention.

Notwithstanding repeated submergence and spraying of very small and finely machined parts, which have been buffed, lapped or ground, as for example, cutters for electric razors or shavers, hypodermic needles, deep drilled metal parts and the like, in and by the solvent incident to conveyance through cleaning apparatus as heretofore ordinarily constructed, there did not result a thorough cleaning or complete removal of adhering dirt or solid matter from the hollows or interstices of such intricate and finely machined parts.

My invention is directed in the main toward overcoming the above pointed out drawback. This objective is attained as hereinafter more fully disclosed, not only by submerging the parts to be cleaned in several successive solvent baths, as well as spraying with the solvent, but additionally by subjecting the parts to be cleaned to ultrasonic vibrations while submerged for a prescribed time interval in a final cleaning bath of the solvent.

Figure 1:
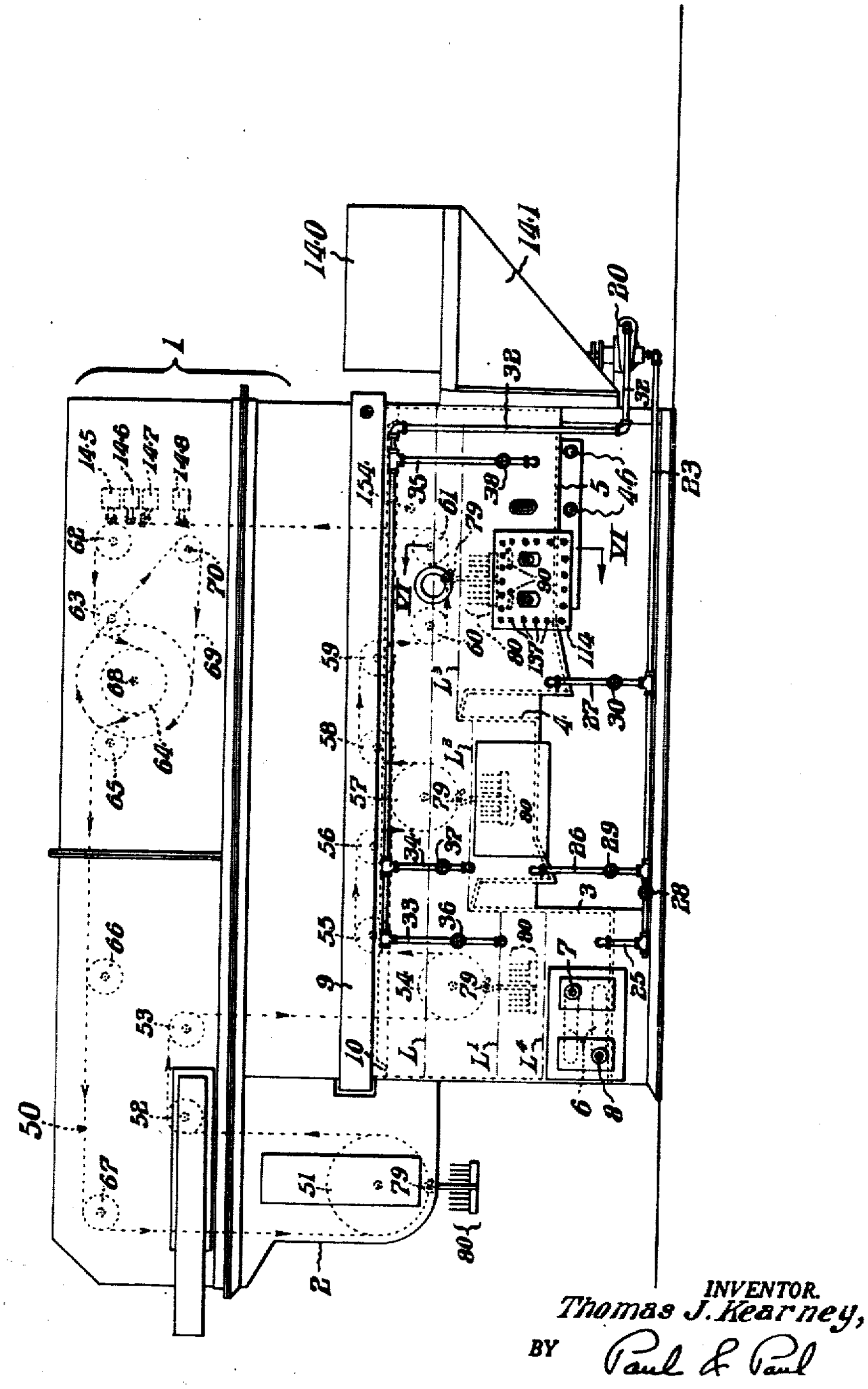
Fig. 1 represents a side elevation of a degreasing and cleaning apparatus suitable for the practice of my improved cleaning method.
Figures 2, 15:
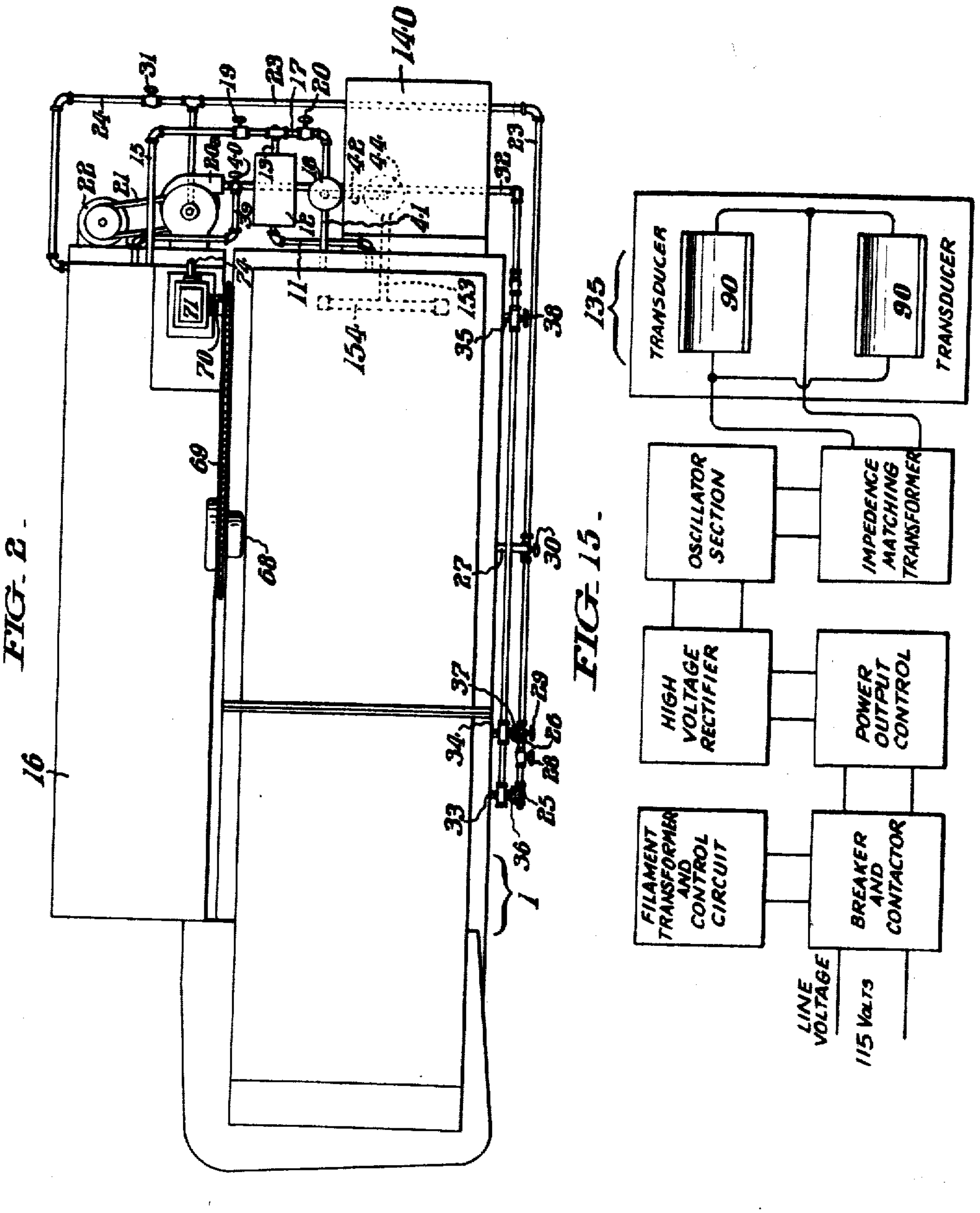
Fig. 2 represents the apparatus in top plan.
Fig. 15 is a diagrammatic view of the oscillator unit by which ultrasonic vibrations are induced in the transducer.
Figure 3:
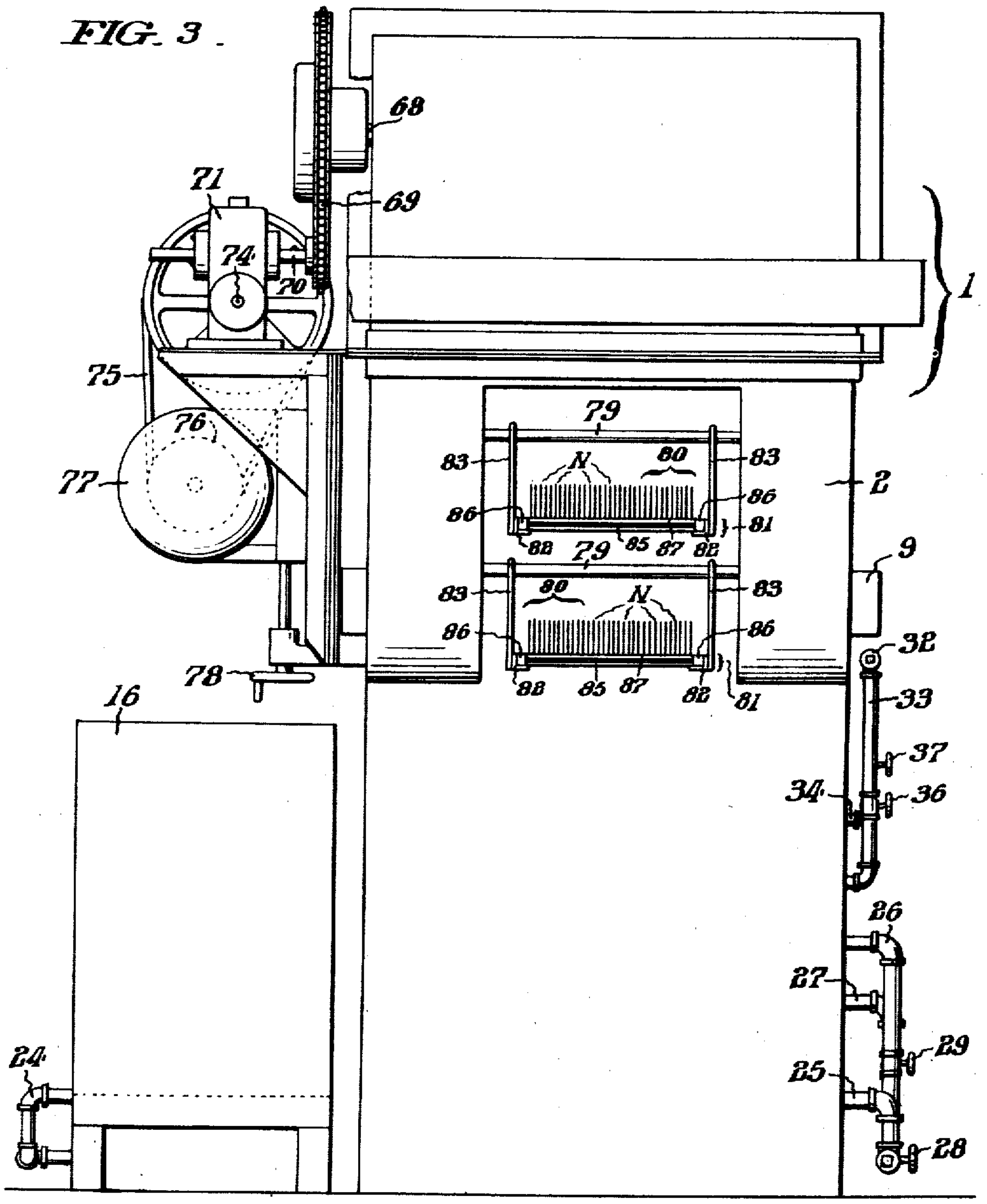
Figs. 3 and 4 are elevation views showing the opposite ends of the apparatus of Fig. 1 on a larger scale.

As exemplified in Figs. 1–4, the apparatus comprises a horizontally elongate housing 1 which, in practice, is constructed with walls of sheet metal, and which, except for an opening at the bottom of an offset hood 2 at the loading end, is completely closed. This housing contains a solvent, whether used as liquid or vapor, and except for the loading aperture is closed to exclude air and retain any solvent vapor that may be present. Serially arranged stepwise within the housing are three wells or chambers 3, 4 and 5, all of which contain liquid solvent such as trichlorethylene or perchlorethylene, and which hereinafter will be referred to respectively as the wash well 3, the rinse well 4 and the ultrasonic cleaning well 5. During operation of the apparatus, the solvent in the wash well 3 is continually boiled by the action of a submerged steam or electrically heated coil 6 of which the inlet and outlet ends are indicated at 7 and 8. Surrounding the housing 1 about midway of its height is a jacket 9 through which coolant (which may be water) is continually circulated by suitable means (not shown) to maintain a top vapor level L above the solvent levels $L^1$, $L^2$, and $L^3$ respectively over the wells 3, 4 and 5 and to provide condensed solvent. Vapor condensation accumulating on the walls of the housing 1 is caught in a perimetric gutter 10 positioned interiorly of said housing somewhat below the level of the water jacket 9. The condensate collecting in the trough 10 is directed through a pipe 11 (Figs. 2 and 4) into a water separator 12 which may be of the conventional gravity type. The solvent outlet 13 of the separator 12 is connected, through a pipe line 15, to a solvent storage reservoir designated 16, and through a pipe line 17 to a spray sump 18, flow through the said pipe lines being controllable by individually interposed valves 19 and 20.

Figure 4:
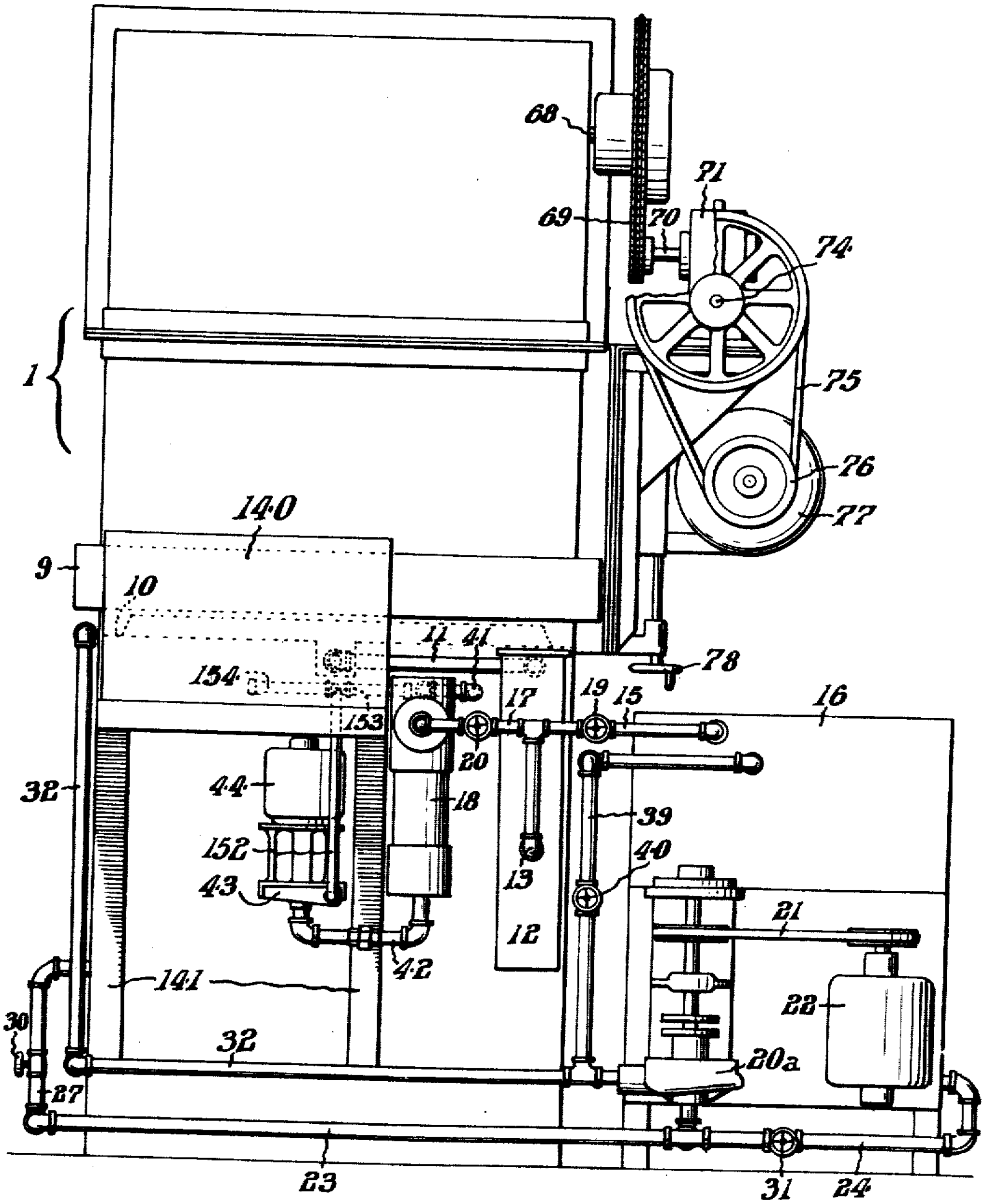

The separator 12 is provided with a water outlet (not shown) which is piped to drain, and a vent connection (not shown). Mounted upon one side of the storage reservoir 16 is a transfer pump 20ª, which is driven through a pulley belt 21 from an electric motor 22. Connected to the intake side of the pump 20ª are suction pipe lines 23 and 24, the former of these having branches 25, 26 and 27, with interposed valves 28, 29 and 30, leading respectively to the wells 3, 4 and 5, the latter having a valve 31 interposed therein and extending from the pump to the bottom of the storage reservoir 16 (Figs. 1 and 4). The discharge side of the pump 20ª is connected, through a pipe 32 having branches 33, 34 and 35 with interposed valves 36, 37 and 38, to the wells 3, 4 and 5 at the top, and through another pipe 39 to the storage reservoir 16, said pipe 39 also having a control valve 40 interposed therein. It will be seen that, by the pump and piping arrangement just described, the solvent contents of the wells 3, 4 and 5 may be individually or collectively pumped into the storage reservoir 16 or vice versa. It will also be apparent that the solvent content of wash well 3, boiled and vaporized by the heating coil 6, condensed by the water jacket 9 and collected in trough 10 will pass through separator connection 11 and water separator 12 and with the valve 19 in line 15 open and the valve 20 in line 17 closed will pass into the storage reservoir 16. In thus transferring solvent by means of the pump 20ª from the wells 4 and 5 to the well 3 and repeating the boiling and vaporizing process, all the solvent in trough 3 can be distilled, denuded of water and stored in the reservoir 16, except for the residue from the work cleaned which will remain in the bottom of the well 3. The pump sump 18 is provided with an overflow connection 41 which allows the solvent to overflow into the ultrasonic well 5. The solvent from well 5 overflows into well 4, and the solvent from well 4 overflows into well 3 where the solvent is boiled and vaporized.

The pump sump 18 is also connected, through a suction line 42, to a solvent spray pump 43 driven by a motor 44 whereof the discharge is pumped into pipe 152, 153 through the wall of the housing 1 above the liquid level of the ultrasonic well 5 where the solvent is discharged as a final spray rinse on the work through spray header and nozzles 154 as it leaves the ultrasonic solvent bath. For a purpose later on pointed out, the well 5 is provided at the bottom with a jacketed bottom or pipe coil 46 through which either water or steam is circulated as may be required to maintain the solvent in said well at a temperature in the range of 110° to 140° F., where the solvent used is trichlorethylene.

Arranged for travel in a circuitous course within the housing 1 is an endless double chain conveyor 50, the path of which is prescribed by a system of sprocket wheels 51—67, the direction of travel being indicated by arrow heads in Fig. 1. As shown, the shaft 68 of the sprockets 64 is coordinated by a sprocket chain connection 69 with the output shaft 70 of a speed reducer 71, and the input shaft 74 of the latter is connected, in turn, by a belt 75 to a variable speed pulley 76 on the shaft of an electric drive motor 77 at the back of the housing 1. The mechanism for adjusting the variable speed pulley 76 may be of any approved commercial type of which only the control wheel is indicated at 78 in Figs. 3 and 4.

Hung from cross rods 79 between the chains of the conveyor 50 at uniformly spaced intervals are carriers 80 for the articles to be cleaned herein exemplified as hypodermic needles N. Each carrier 80 comprises a tray 81 with angle section side bars 82 to which the suspension hooks 83 are rigidly secured at the center as best seen in Figs. 5–8. Extending between and welded at their ends to the side bars 82 of each tray 81 are several connecting channel section cross bars 85 of which groups of four each are symmetrically arranged forwardly and rearwardly of the suspension hooks 83 and spaced one from another in each group by upright spacer pieces 86 integrated with said side bars. Individually associated with the cross bars 85 are removable complemental invert channel section bars 87 which, at uniformly spaced longitudinal intervals, are provided in their cross webs, as instanced in Fig. 8, with apertures 88 for upward projection through them of the shanks of the needles N with the squared head portions *n* of the latter occupying the closed hollow provided by the complemental pairs of channel bars 85, 87. In the illustrated instance, each pair of the channel bars 85, 87 is proportioned to support a transverse row of twenty-five needles; and it is to be particularly noted that the cross webs of the channel bars 85 are provided with apertures 89 in vertical axial alignment with the apertures 88 in the channel bars 87.

By automatically operative means, the motor 77 is operated so that the conveyor 50 is caused to dwell for definite time intervals with three of the carriers 80 within the wash, rinse and ultrasonic cleaning wells 3, 4 and 5 as shown in Fig. 1. When desired motor 77 is operated intermittently to cause the carriers 80 to stop temporarily within the wells. After traversing the housing 1, the carriers 80 containing the cleaned needles are unhooked from the conveyor 50 as they emerge at the bottom of the offset hood 2 of the housing and replaced by freshly loaded carriers with unclean needles.

Figure 5:
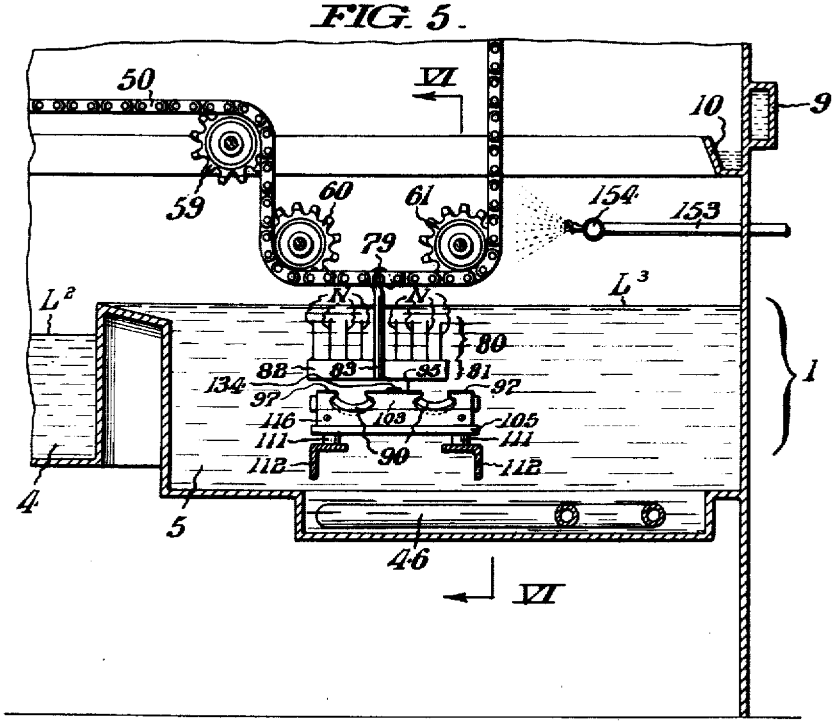
Fig. 5 is a fragmentary view showing a portion of the apparatus of Fig. 1 in longitudinal section likewise on a larger scale.
Figures 6, 7, 8:
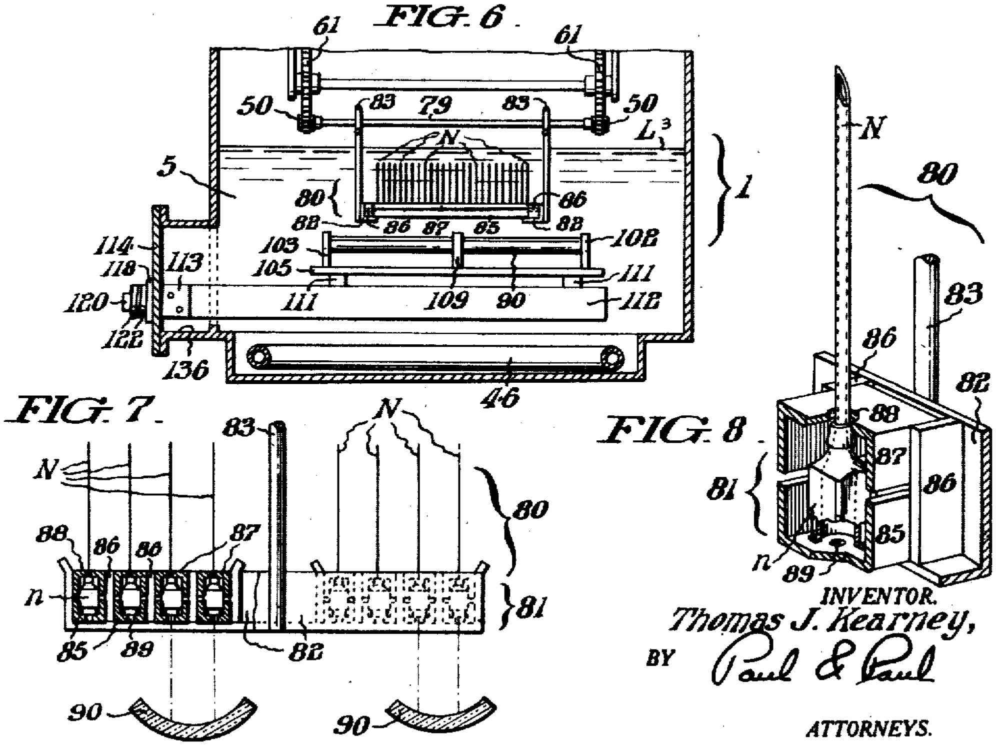
Fig. 6 is a fragmentary view in transverse section taken as indicated by the angled arrows VI—VI in Figs. 1 and 5.
Fig. 7 is a view partly in elevation and partly in section of one of the work supporting carriers of the apparatus.
Fig. 8 is a fragmentary detail sectional perspective view of the carrier shown in Fig. 7.
Figures 9, 13, 14:
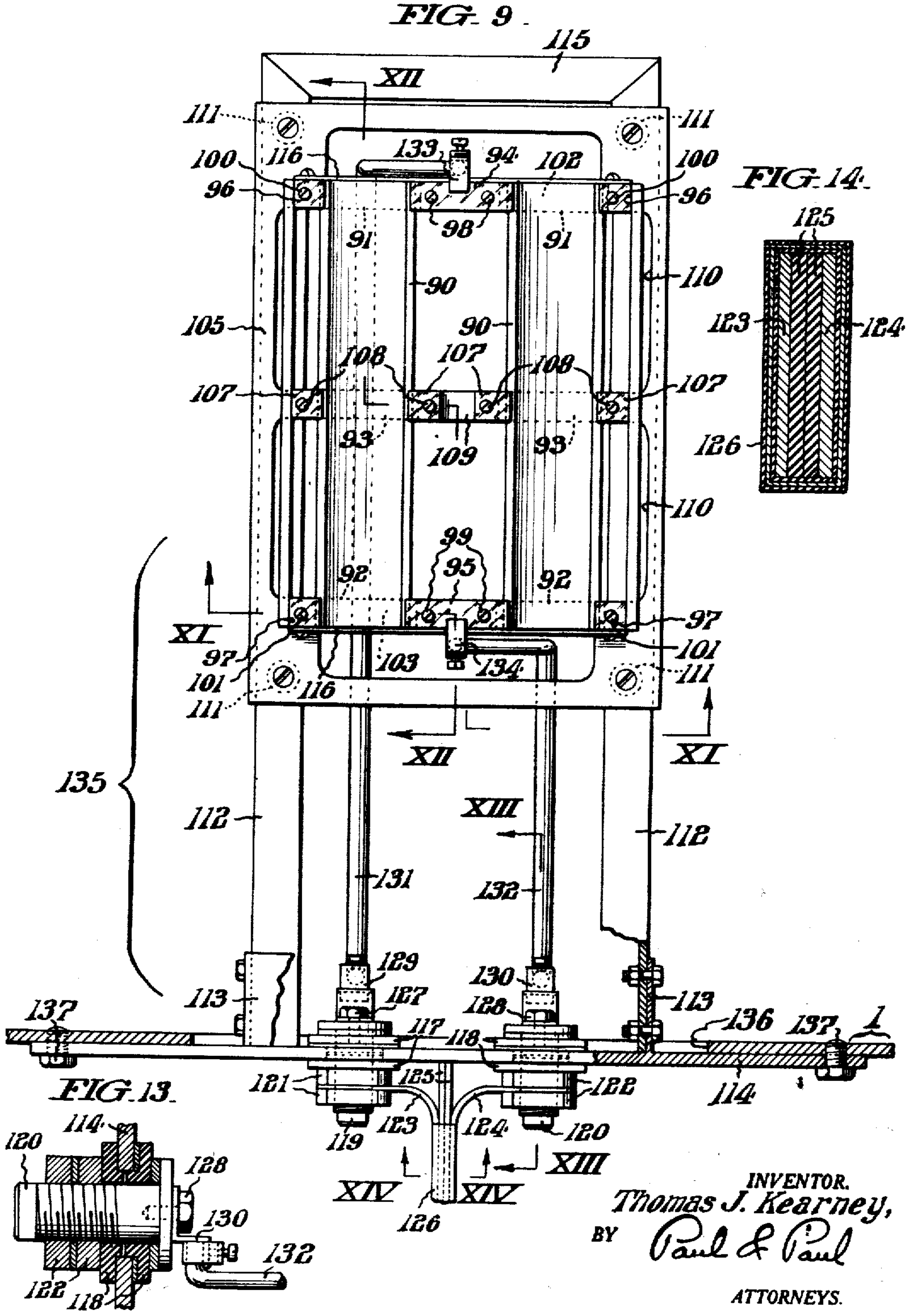
Fig. 9 is a top plan view of a unit by which the transducers are supported in the apparatus.
Figs. 11, 12, 13 and 14 are detail sectional views taken as indicated respectively by the angled arrows XI—XI, XII—XII, XIII—XIII, and XIV—XIV in Fig. 9.
Figure 10:
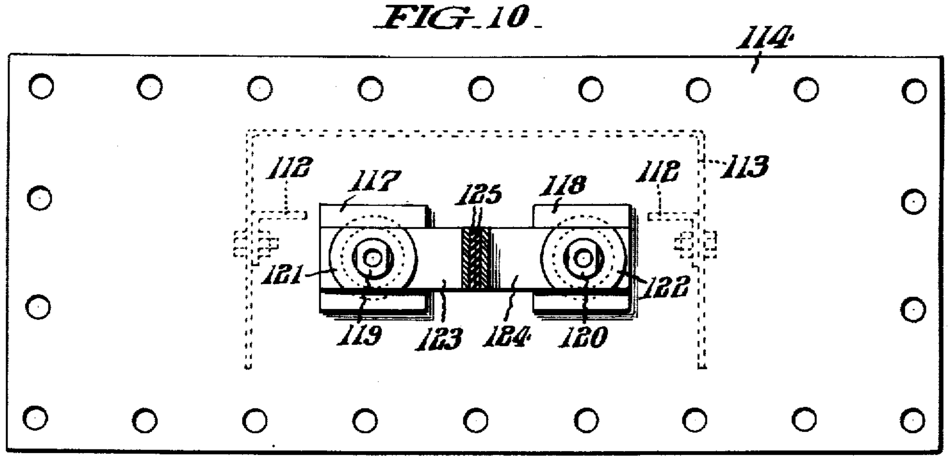
Fig. 10 represents a front elevation view of the unit of Fig. 9.
Figure 11:
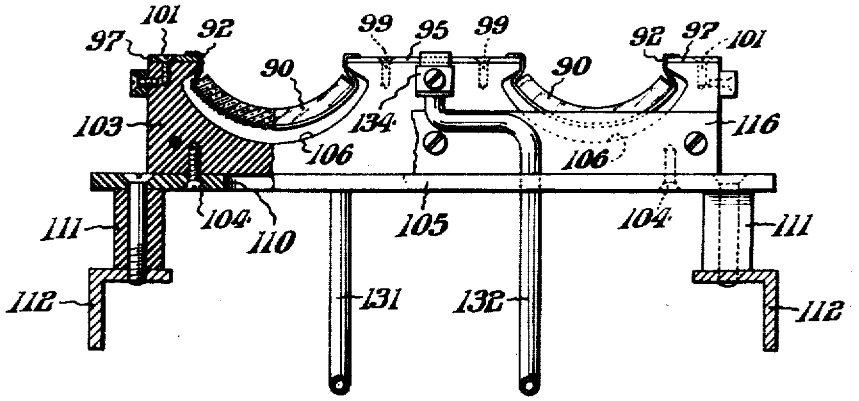
Figure 12:
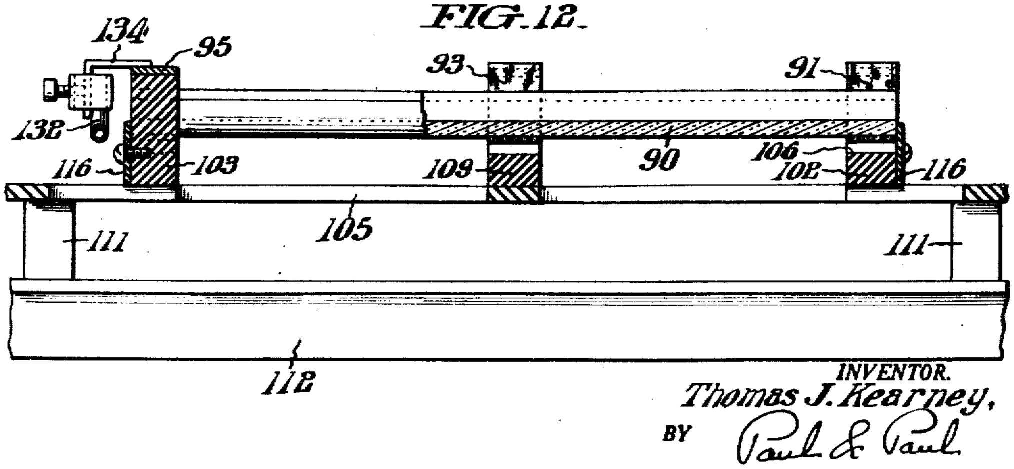
Figure 16:
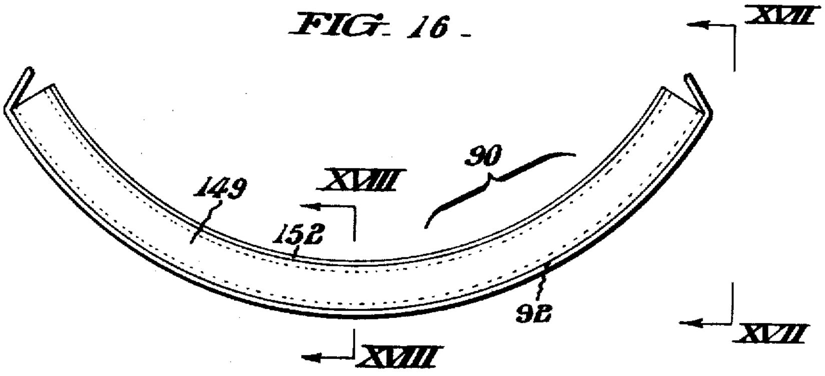
Fig. 16 represents an end view of the transducer on an enlarged scale.
Figure 17:
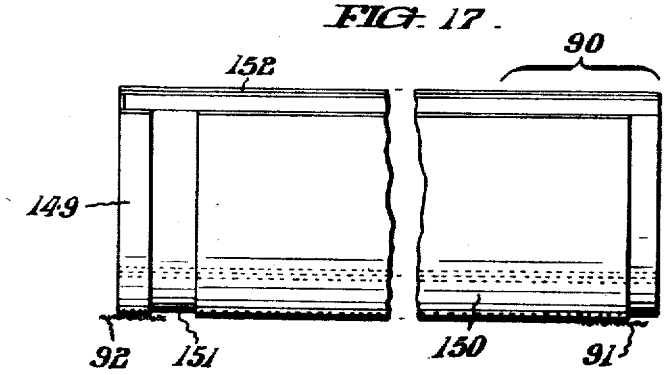
Fig. 17 is a side view of the transducer taken as indicated by the angled arrows XVII—XVII of Fig. 16.
Figure 18:
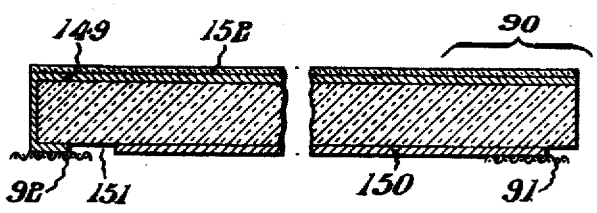
Fig. 18 is a sectional view of the transducer taken as indicated by the angled arrows XVIII—XVIII of Fig. 16.

Disposed in the well 5 below the solvent level therein is a means for inducing vibrations of ultrasonic frequency as an aid to insure complete cleaning of the articles N while submerged in the solvent as shown in Figs. 5 and 6. As herein exemplified, this vibration inducing means comprises a pair of transducers 90 (Figs. 9, 11 and 12), each being elongate and concavely arcuate in cross section. In accordance with my invention, these transducers 90 are molded or otherwise fashioned from ceramic material such as barium titanate or the like having piezoelectric properties and are provided with silver coatings to form the electrodes 149 and 150 disposed on the concave and convex surfaces of the transducer 90. The transducer 90 is silvered in such a way that the electrode 149 on the concave surface extends around one end of the transducer and for a short distance on the convex side. Electrode 149 is separated from electrode 150 by an area 151 which is unsilvered. This arrangement permits making electrical contact with both electrodes 149 and 150 from the convex side of the transducer 90. The transducers 90 are provided with a coating of phenolic or ceramic glaze 152 to prevent deterioration thereof due to cavitation of the solvent on the concave surface thereof. Adjacent opposite ends and at the center, the transducers are nonrigidly supported transversely of the well 5 by flexible woven cradle straps 91, 92 and 93 of soft copper wire. From Figs. 9, 11 and 12, it will be noted that the confronting ends of the straps 91 and 92 are united by flat metal plates 94 and 95, and provided at their remote ends with reinforcing tabs 96 and 97 respectively. The plates 94, 95 and the tabs 96 and 97 are secured by screws 98, 99 and 100, 101 to the high portions of blocks 102 and 103 of insulation secured, in turn by screws 104 as instanced in Fig. 11, to a plate 105 of insulation, said blocks being gouged as at 106 to clear the bottoms of the transducers by a substantial margin. The center straps 93 have reinforcing tabs 107 at their opposite ends secured by screws 108 to the raised portions of an intermediate block 109 of insulation exactly like the blocks 101 and 102 similarly affixed to the plate 105. As shown, the plate 105 is open centrally as at 110 so that any solid particles of dirt or foreign matter released from the articles during the ultrasonic treatment as presently explained can fall through it to the bottom of the well 5. The plate 105 is rigidly sustained at its corners by four posts 111 of insulation (Figs. 9 and 11) from the side bars 112 of a metallic supporting frame, said side bars being bolted at one end to rearward channel section projections 113 (Figs. 9 and 10) of a rectangular metallic plate 114 and being rigidly connected at their opposite ends by a cross bar 115. The transducers 90 are restrained against endwise displacement by stop strips 116 of insulation secured to the outer faces of the blocks 102 and 103. Extending through laterally-spaced holes in the plate 114 in the interval between the side bars 112 of the frame, with interposition of insulation washers 117 and 118, are headed bolts 119 and 120; and secured between clamp nuts 121 and 122 threadedly engaged upon the protruding shank ends of said bolts 119 and 120, are the ends of strap conductors 123 and 124. These strap conductors 123 and 124 are brought forward into parallel relation as in Fig. 9 and wrapped together with intervening strips 125 of dielectric material which may be of "Plexiglass," by means of "Scotch" tape 126 or the like. Affixed by cap screws 127 and 128 to the inner or head ends of the bolts 119 and 120 are lugs 129 and 130 (Figs. 9 and 13) in which flexible hose conductors 131 and 132 of copper or the like are secured at one end, the other ends of said conductors being secured to similar lugs 133 and 134 on the center terminal plates 94 and 95 by which the cradle conductor straps 91 and 92 are joined. The transducer unit thus formed and comprehensively designated 135 is inserted through a clean-out opening 136 in the front wall of the housing 1 (which wall also serves for the trough 5), said opening being covered or closed by the plate 114 which is removably fastened along its edges by bolts 137, see Figs. 1 and 9.

Electric current at ultrasonic frequency flows from an electrically operated oscillator unit 140 (Figs. 1, 2 and 4) through strap 124, the lug 130, conductor 132, lug 134, flexible woven copper wire cradle straps 92, electrodes 149 to electrodes 150, straps 91, lug 133, conductor 131, lug 129 and through strap 123 to return to the oscillator unit 140.

Disposed one above the other within the housing 1, as shown in Fig. 1, are four limit switches 145, 146, 147 and 148 whereof the actuating arms project into the path of the cross rods 79 of the conveyor. The function of these switches and their associated means (not shown) is to intermittently start and stop the conveyor and the work carrier 80 when desired, so that the rows of work N are positioned above the transducer 90 (Fig. 7) for a purpose hereinafter explained.

According to the present invention the work to be cleaned and degreased is subjected to the action of a chlorinated hydrocarbon solvent. This liquid solvent is preferably trichlorethylene whose boiling point is 188° F. Perchlorethylene and also methylene chloride have been used as the liquid solvent in place of trichlorethylene. The liquid solvent in the wash bath is maintained at boiling temperature. Depending on the type of oils and soil deposited on the work to be cleaned, it may easily be determined whether better cleaning results are obtained by immersing the work for a definite time interval in the wash bath or by holding the work in the vapors given off by the boiling wash bath for a definite period of time. These time intervals are very short, the washing operation being accomplished in a matter of seconds.

From the wash bath, the work to be cleaned is passed to a rinse bath of the liquid solvent. Here the work is immersed in a warm bath of the liquid solvent used. For trichlorethylene, the preferable range of temperature for this rinse bath is between 170 and 180° F. Immersion in the rinse bath cools the work piece and this cooling rinse bath also eliminates the possibility of "setting up" certain soils resulting from operation of the wash bath in the previous step of the process. Certain soils are not cleaned from the work piece by subjecting that piece to the boiling liquid solvent of the wash bath or the vapors arising therefrom, but on the contrary, may be so effected as to make the cleaning more difficult. The rinse bath prepares these certain soils and, by reducing the temperature of the work piece, prepares the work piece for the subsequent cleaning stages of the herein described process. The time of submergence in the rinse bath is a matter of seconds.

When the rinsing has been completed, the work piece is taken to the ultrasonic bath where it is submerged in the liquid solvent at a temperature which is below that of the rinse bath. It has been found that the optimum temperature of the ultrasonics bath is in the range of 110 to 140° F. where the liquid solvent used is trichlorethylene. The work and the trichlorethylene of the ultrasonics bath are subjected to ultrasonic vibrations. These ultrasonic vibrations operate to remove the grease, oil and soil still deposited on the work piece so as to leave that piece in a highly clean condition. The work piece is subjected to these vibrations for a number of seconds. So long as the barium titanate transducers which produce the ultrasonic vibrations are submerged in liquid solvent at a temperature of about 140° F. or less, sufficient cooling is provided so that the transducers can operate continuously without any part thereof reaching the Curie or transition temperature of the ceramic material.

Some of the soil and grease may still be loosely attached to the work piece and to remove such soil, the work piece is next passed through a spray zone where the work is sprayed with the clean liquid solvent of pure distillate, the impinging of the spray on the work serving to jar the soil loose.

As a final step, the work is then carried through a heating zone where any film of the solvent is removed by evaporation and from which the work emerges clean and dry.

The work piece can only be as clean as the liquid from which it is removed. The liquid solvent in all stages of the process is maintained at a high degree of cleanliness by continuous distillation and filtering. The solvent is distilled by taking the vapor given off by the wash bath 3 and condensing it. This condensate is passed in turn into the ultrasonics bath 5, the rinse bath 4 and the wash bath 3. In the wash bath 3, the liquid solvent is again vaporized by boiling. Filters (not shown) are provided for the ultrasonic bath 5 for the purpose of disposing of the solid materials which are removed from the work piece and which settle to the bottom of the ultrasonic bath well 5. The liquid solvent containing such solid materials is taken from the ultrasonic bath 5, passed through a filter and then returned.

For a better understanding of the method of this invention, reference may be had to the accompanying drawings which illustrate a preferred system for practicing the invention.

Referring to the drawings, the work to be cleaned N is placed on work carrier 80, suspended from cross rods 79 of the conveyor 50, at the position under the sprocket wheel 51. The conveyor 50 carries the work N to be cleaned through the degreasing and cleaning cycle. The work N is first transported by conveyor 50 to pass sprocket wheels 52 and 53 to pass under sprocket wheel 54 where it is immersed for a short time interval in the well 3 which contains the boiling liquid solvent. If the work N is covered by the type grease and soil which makes immersion in the boiling liquid solvent of well 3 unnecessary, the liquid level in well 3 can be lowered from level $L^1$ to level $L^4$ and the work N will come in contact with only the vapor of the boiling liquid solvent.

Next the conveyor 50 takes the work N upward to sprocket wheel 55, horizontally to sprocket wheel 56 and downwardly to wheel 57 where work N is submerged for a definite time interval in well 4 containing a rinse bath of the liquid solvent at a temperature below the boiling point of the solvent.

Then work piece N is conveyed upwardly to wheel 58, over to wheel 59, and downwardly to wheel 60 for immersion in the ultrasonic bath well 5.

For intermittent operation, N is conveyed horizontally to a stop position where work N is immersed in the well 5 with half of the work N in the focus of the dual ultrasonic beams given off by the pair of transducers 90 (see Fig. 5). After a definite period of time, work N is moved to the next stop position with the remaining half of the work N in the focus of the dual ultrasonic beams given off by the pair of transducers 90. Here the work N remains for a similar time period.
the work N around sprocket wheel 61, and upwardly to pass the spray header and nozzles 154 where work N is sprayed by the liquid solvent.

The work N then passes through the final heating stage from which it emerges clean and dry. The top of the interior of the housing 1 is heated, and conveyor 50 transports work N through this hot area by conducting it from sprocket wheel 62 to wheel 67, thence downwardly to position under wheel 51 where the now thoroughly cleaned and degreased work N is removed from work The conveyor 50 is operated either continuously or carrier 80.

The conveyor 50 is operated either continuously or intermittently as hereinbefore described. When operated continuously the conveyor 50 moves at such a rate of speed as to immerse the work N in the baths for the specified time intervals. When operated intermittently the conveyor 50 stops for definite periods of time when the work N is within the wells.

*Example 1*

The work N to be cleaned is submerged for about 3 to 20 seconds in the well 3 which contains a wash bath of trichlorethylene at boiling temperature. Next the work N is immersed in well 4 for about 3 to 20 seconds and subjected to a cooling rinse bath of trichlorethylene at a temperature in the range of 160 to 187° F. After this step, the work N is submerged for a period of about 3 to 20 seconds in the cooling ultrasonic bath of well 5 of trichlorethylene at a temperature in the range of 110 to 140° F. Here the work N passes over the ultrasonic beams given off by the transducers 90, the vibrations being in the range of 10 to 10,000 kc. The conveyor 50 then takes the work N upwardly to pass the nozzles 154 which spray trichlorethylene on the work N. Finally the conveyor 50 transports the work N through the hot area along the top interior of the housing 1 to accomplish thorough drying, thence to the opening 2 where the now clean work N is removed.

*Example 2*

The process as described in Example 1 except the first step of the process is to pass the work to be cleaned N through the vapor given off by the boiling trichlorethylene of well 3 rather than submerging the work N in the liquid of the well. This is accomplished by maintaining the trichlorethylene in the well at level $L^4$ instead of at level $L^1$.

*Example 3*

The process as described in Example 1 in which the liquid solvent is methylene chloride instead of trichlorethylene, the temperature of the ultrasonic bath liquid is in the range of about 58 to 78° F., and the temperature of the rinse bath is in the range of about 80 to 100° F.

*Example 4*

The process as described in Example 1 wherein the liquid solvent is perchlorethylene instead of trichlorethylene, the temperature of the ultrasonic bath liquid is in the range of about 140 to 170° F., and the temperature of the rinse bath is in the range of about 180 to 245° F.

While the specific embodiment of the invention described herein has been confined to the method of cleaning a work object by treatment while submerged in a chlorinated hydrocarbon solvent, it will be aprpeciated that the process of the invention can be used to accomplish a variety of objects and is not limited to cleaning or degreasing. For example, the invention has application in the field of plating where the work object is immersed in a liquid and the ultrasonic vibrations induce an even coating to cover the work object.

Having thus described my invention, I claim:

1. A method of cleaning a work object which comprises contacting and treating the work object for a definite time interval with a chlorinated hydrocarbon solvent in a zone; removing said work object from said zone and submerging it in a bath of liquid chlorinated hydrocarbon, carrying said work object through a predetermined path through said liquid, piezoelectrically generating ultrasonic waves at a generating zone within said liquid out of direct mechanical contact with said work object, directing said waves toward said path for impinging upon said work object while it is being carried through said path, and subjecting said work object to said ultrasonic waves, said waves traveling freely and directly through the liquid between said generating zone and said work object.

2. A method of cleaning a work object which comprises submerging the work to be cleaned for a definite time interval in a wash bath of a liquid chlorinated hydrocarbon solvent at boiling temperature; removing the work from said bath and submerging it for a definite time interval in a cooling ultrasonic bath of the liquid chlorinated hydrocarbon solvent at a temperature below that in the said wash bath; piezoelectrically generating ultrasonic vibrations at a generating zone within said liquid of the ultrasonic bath out of direct mechanical contact with said work object and subjecting the work object and the liquid solvent of the ultrasonic bath to said ultrasonic vibrations during the period of the submergence of the work in the ultrasonic bath.

3. A method of degreasing according to claim 2, comprising also the steps of boiling the liquid solvent in the wash bath; condensing the vapor arising from said bath; passing the condensation of liquid solvent to the ultrasonic bath and maintaining it at a predetermined temperature below boiling, and then passing the liquid solvent to the wash bath and maintaining it at boiling temperature.

4. A method of degreasing according to claim 2, further characterized by the fact that the liquid solvent is trichlorethylene and the temperature of the ultrasonic bath liquid is in the range of about 110 to 140° F.

5. A method of degreasing according to claim 2, further characterized by the fact that the liquid solvent is methylene chloride and the temperature of the ultrasonic bath liquid is in the range of about 58 to 78° F.

6. A method of degreasing according to claim 2, wherein the ultrasonic vibrations are in the range of about 10 to 10,000 kc.

7. A method of degreasing according to claim 2, wherein the work to be cleaned is submerged in the ultrasonic bath for an interval of time of about 3 to 20 seconds.

8. A method of degreasing according to claim 2, wherein the liquid solvent is perchlorethylene and the temperature of the ultrasonic bath liquid is in the range of about 140 to 170° F.

9. A method of cleaning a work object which comprises submerging the work object to be cleaned for a definite time interval in a wash bath of liquid solvent at boiling temperature; removing the work object from the wash bath and submerging it in a cooling rinse bath of the liquid solvent for a definite time interval at a temperature below the boiling point of the liquid solvent; removing the work object from the rinse bath and submerging it for a definite time interval in a cooling ultrasonic bath of dielectric liquid solvent at a temperature below that of the rinse bath, piezoelectrically generating ultrasonic vibrations at a generating zone within said liquid of the ultrasonic bath out of direct mechanical contact with said work object and subjecting the work and the liquid solvent of the ultrasonic bath to said ultrasonic vibrations during the period of the submergence of the work in the ultrasonic bath.

10. A method of cleaning according to claim 9, comprising also the steps of boiling the liquid solvent in the wash bath, condensing the vapor arising from said bath, passing the condensation of liquid solvent to the ultrasonic bath and maintaining it at a predetermined temperature below boiling, then passing the liquid solvent to the rinse bath and maintaining it at a predetermined temperature between the temperature of the ultrasonic bath and boiling, and then passing the liquid solvent to the wash bath and maintaining it at boiling temperature.

11. A method of cleaning according to claim 9, wherein the liquid solvent is trichlorethylene and the temperature of the liquid solvent in the rinse bath is in the range of about 160 to 188° F.

12. A method of cleaning according to claim 9, wherein the liquid solvent is methylene chloride and the temperature of the liquid solvent in the rinse bath is in the range of about 80 to 100° F.

13. A method of cleaning according to claim 9, wherein the liquid solvent is perchlorethylene and the temperature of the liquid solvent in the rinse bath is in the range of about 180 to 245° F.

14. A method of cleaning according to claim 9, wherein the work to be cleaned is submerged in the rinse bath for an interval of time of about 3 to 20 seconds.

15. A method of cleaning according to claim 9, comprising also the step of removing the work from the ultrasonic bath and then passing it through a spray zone where the work is sprayed by the liquid solvent.

16. A method of cleaning according to claim 15, comprising also the step of passing the work from the spray zone through a final heating zone from which the work emerges clean and dry.

17. A method of cleaning a work object which comprises passing the work to be cleaned through a zone of dielectric vapor solvent; removing the work object from the zone of dielectric vapor solvent and submerging it for a definite time interval in a cooling ultrasonic bath of dielectric liquid solvent at a temperature below the boiling point of the dielectric liquid solvent, piezoelectrically generating ultrasonic vibrations at a zone within the solvent of the ultrasonic bath out of direct mechanical contact with said work object and subjecting the work and the dielectric liquid solvent of the ultrasonic bath to said ultrasonic vibrations during the period of the submergence of the work in the ultrasonic bath.

18. A method of degreasing which comprises submerging the work to be cleaned for a period of about 3 to 20 seconds in a wash bath of trichlorethylene at boiling temperature; removing the work from the boiling wash bath and submerging it in a cooling rinse bath of the trichlorethylene for a period of about 3 to 20 seconds at a temperature in the range of 160 to 188° F.; removing the work from the rinse bath and submerging it for a period of about 3 to 20 seconds in a cooling ultrasonic bath of the trichlorethylene at a temperature in the range of 110 to 140° F., piezoelectrically generating ultrasonic vibrations in the range of 10 to 10,000 kc. at a zone within the trichlorethylene of the ultrasonic bath out of direct mechanical contact with said work to be cleaned and subjecting the work and the trichlorethylene of the ultrasonic bath to said ultrasonic vibrations during the period of submergence of the work in the ultrasonic bath;

then passing the work through a spray zone where the work is sprayed by the trichlorethylene; and then passing the work from the spray zone through a final heating zone from which the work emerges clean and dry.

19. A method of treating a work object which comprises treating the work object with a vapor; then submerging the work object in a liquid bath of nonpolar organic degreasing solvent, piezoelectrically generating ultrasonic vibrations at a generating zone within said solvent of the bath out of direct mechanical contact with said work object and subjecting the submerged work object and the solvent of said bath to said ultrasonic vibrations.

References Cited in the file of this patent

UNITED STATES PATENTS

| | | |
|---|---|---|
| 2,101,840 | Dinley | Dec. 14, 1937 |
| 2,118,480 | Somes | May 24, 1938 |
| 2,484,014 | Peterson | Oct. 11, 1949 |
| 2,616,820 | Bourgeaux | Nov. 4, 1952 |

OTHER REFERENCES

Handbook of Chemistry & Physics 33rd ed., 1951–52, pgs. 2110, 2111 and 2113. Chemical Rubber Publishing Co., Cleveland, Ohio.

UNITED STATES PATENT OFFICE

CERTIFICATE OF CORRECTION

Patent No. 2,802,758 August 13, 1957

Thomas J. Kearney

It is hereby certified that error appears in the printed specification of the above numbered patent requiring correction and that the said Letters Patent should read as corrected below.

Column 6, line 47, before "the work" insert -- From ultrasonic bath well 5, the conveyor 50 takes --, as the beginning of a paragraph; column 6, line 57, strike out "The conveyor 50 is operated either continuously or".

Signed and sealed this 21st day of January 1958.

(SEAL)
Attest:

KARL H. AXLINE
Attesting Officer

ROBERT C. WATSON
Commissioner of Patents